United States Patent Office 3,317,479
Patented May 2, 1967

3,317,479
CHLOROHYDRIN OF OILY POLYBUTADIENE POLYMERS AND METHODS FOR PREPARING SAME
Allen Noshay, Fords, and Anthony H. Gleason, Scotch Plains, N.J., assignors to Esso Research and Engineering Company, a corporation of Delaware
No Drawing. Filed Jan. 15, 1962, Ser. No. 166,373
3 Claims. (Cl. 260—77.5)

The present invention is concerned with improved polybutadiene type polymers. More particularly, it deals with the chlorohydrin derivatives of oily polybutadiene type polymers and means for preparing same.

There is a large commercial demand for resins that can readily cure at room temperature while exhibiting good characteristics with respect to hardness and solvent resistance, as well as flame resistance. While heretofore oily polybutadiene type polymers have been known in the art, room temperature cures of such polymers could not readily be performed. Moreover, coatings derived from such polymers were not immune to attack by fire.

In accordance with the present invention, means are taught for obtaining a modified oily polybutadiene type polymer which offers the above desired properties, particularly ability to cure at room temperature, as well as improved flame resistance. Specifically the chlorohydrin derivatives of oily polybutadiene type polymers have now been prepared and been found to offer these advantageous properties.

The term "oily polybutadiene type polymers" is used in the present specification to denote polymers containing 60 to 100 weight percent butadiene-1,3 with remaining portion, e.g., 1 to 40 weight percent, of the polymer styrene, and other olefins or their derivatives. Thus, this designation includes polybutadiene homopolymer and oily copolymers of butadiene, particularly the oily copolymer of about 75 to 85 weight percent butadiene and 15 to 25 weight percent styrene. These polybutadiene polymers may be prepared by a variety of methods. Polymerization in the presence of alkali metal such as sodium or potassium is preferred. This conventional process is carried out in a reaction diluent at a temperature from about 25° to 95° C., and is desirably continued until complete conversion of monomers is obtained. About 1.2 to 5 parts, preferably 1.5 to 4 parts, of finely divided alkali metal, e.g., soduim, may be used as catalyst per 100 parts by weight of monomer. Inert hydrocarbons which remain liquid under the reaction conditions employed are used as diluents in the polymerization step. Examples thereof are aliphatic hydrocarbons such as naphtha, or straight run mineral spirits, as well as other hydrocarbons such as benzene, cyclohexane, toluene, pentane, etc. The hydrocarbon diluents are generally used in amounts of 100 to 500 parts per 100 parts of monomer. Prior to modifying these polybutadiene type polymers in accordance with the present invention, it is desirable to concentrate the non-volatile matter to at least 90% and preferably 100%. The presence of the polymerization solvent is unnecessary and generally undesirable, except in small amounts. The number average molecular weight of the oily polybutadiene type polymer treated in accordance with the present invention will fall within the range of about 300 to 5,000, preferably 500 to 1,000.

These oily polybutadiene type polymers are then modified so as to obtain an oily or solid polybutadiene chlorohydrin, characterized by number average molecular weights of between about 400 to 10,000, preferably 1,000 to 2,000, and containing one chlorohydrin group for every 1 to 10, preferably 2 to 5, butadiene units. It contains 0–90%, preferably 50–80%, of the theoretical unsaturation found in the unmodified polymer.

The polybutadiene chlorohydrin polymers prepared in accordance with the present invention can readily be cured at room temperatures by the use of curatives such as toluene diisocyanate or other diisocyanates such as hexamethylene diisocyanate. Cure times of five minutes to several hours have been found to be satisfactory. The use of a curing catalyst such as triethylamine, diethyl cyclohexylamine and lead naphthenate, has been found to be desirable. The use of a low viscosity secondary glycol, e.g., a $C_2$ to $C_{10}$ aliphatic glycol, as a reactive hydroxy-containing diluent is also desirable. In general, a stoichiometric amount of curative based on the —OH content of the polybutadiene chlorohydrin and other —OH containing additives is employed. The resulting castings offer improved flame resistance and provide a hard surface. Thus, they may readily be employed for use in preparing coatings, castings, laminates, and rigid foams.

The polybutadiene chlorohydrin polymers of the present invention are preferably prepared by reacting the polybutadiene polymer with an alkyl hypochlorite and water at a temperature in the range of 10 to 75, particularly 30° to 50° C., for 15 minutes to several hours. Especially advantageous results are obtained by employing tertiary butyl hypochlorite, e.g., 0.2 to 2.0 parts by weight per weight of polymer, and water to hypochlorinate the polybutadiene type polymers. This combination is particularly effective since tertiary butyl hypochlorite has unusually good stability and shelf life. The hypochlorination may be effected in a homogeneous solution under a relatively broad range of conditions. Although less desirable, alkyl hypochlorites such as tertiary amyl and ethyl may alternatively be employed. A diluent such as dioxane or the lower alkyl acetate esters which are solvents for the polymers and hypochlorites and can tolerate small amounts of water, is generally employed in the reaction zone in amounts ranging from 100 to 500 weight percent, based on polybutadiene polymer to be treated.

In a less desirable process for preparing the polybutadiene chlorohydrin polymers of the present invention, the polybutadiene type polymers may be first epoxidized and then reacted with hydrogen chloride. Epoxidation may be carried out as described in U.S. Patent 2,842,513 among others. Typically, a polybutadiene polymer is epoxidized by reaction with a peracid, or a compound capable of yielding oxygen, in the presence of a solvent and at a temperature sufficient to yield the epoxidized polymer. Unsaturated bonds of the aforementioned polymers, e.g., polybutadiene, butadienestyrene, are thus converted to epoxide groups. The epoxidation reaction may be carried out at a temperature in the range of 0 to 95° C. employing peracids or the hydroperoxides as the oxidation agents. Peracetic and perbenzoic acid are preferred. The polymer is dissolved in a suitable solvent such as normal heptane, chloroform, ethyl chloride and the like, and reacted for one to 60 hours. The resulting product normally contains 1 to 10 weight percent epoxide In accordance with the present invention, this expoxidized polybutadiene oily polymer is then reacted with hydrogen chloride so as to convert the epoxide group into one containing OH and Cl groups. This is done at a temperature of 25° C. to 75° C. by reaction with hydrogen chloride or a material capable of liberating hydrogen chloride. The epoxidized polybutadiene is generally dissolved in an aromatic solvent, such as benzene, during the hydrochlorination step.

Various aspects and modifications of the present invention will be made more clearly apparent by reference to the following description and accompanying examples.

Example 1

The polychlorohydrin derivative of oily polybutadiene type polymers was prepared in the following manner, using tertiary butyl hypochlorite as the hypochlorinating agent.

Fifty-five grams (0.5 mole) of tertiary butyl hypochlorite were charged to a flask containing 54 grams of polybutadiene having a number average molecular weight of about 2,500. The polybutadiene was dissolved in 200 grams of dioxane. To this mixture was added dropwise a solution of 10 grams (0.55 mole) of water and 0.5 gram acetic acid in 50 grams of dioxane. The temperature of the reaction mixture was kept at 20 to 30° C. with stirring until the reaction was complete, as evidenced by the disappearance of the yellow color of the hypochlorite. A total reaction time of 2.5 hours was employed.

The polychlorohydrin polymer produced may be recovered by precipitation with methanol, petroleum ether, or water, or removal of the dioxane and by-product butanol by distillation. In the present example, the chlorohydrin of polybutadiene was recovered by the distillation method.

The polychlorohydrin derivatives of polybutadiene thus recovered contained one chlorohydrin group per 3 butadiene units and had a number average molecular weight slightly greater than the original polymer.

As is thus illustrated, the polychlorohydrin derivative may be readily prepared from oily polybutadiene type polymers under homogeneous solution reaction conditions by employing tertiary butyl hypochlirite as the hypochlorinating agent.

Examples 2 and 3

The following experiments illustrate the preparation of hyprochlorinated polybutadiene polymers by means of hydrochlorinating epoxidized polybutadiene polymer.

A typical polybutadiene polymer was epoxidized in a conventional manner, examples thereof being the peracetic acid epoxidation methods described in U.S. 2,919,283 and U.S. 2,660,563. The resulting epoxidized polybutadiene polymer denoted "epoxidized polybutadiene X" had the following properties:

| | |
|---|---|
| Appearance | Amber liquid. |
| Viscosity, poises at 25° C. | 1800. |
| Active ingredients, percent | 100. |
| Specific gravity | 1.010. |
| Epoxy percent | 9.0. |
| Epoxy equivalent [1] | 177. |
| Hydroxyl percent | 2.5. |
| Iodine number | 185. |

[1] Number of grams of resin containing 1 gram mole of epoxide.

Epoxidized polybutadiene X was then hydrochlorinated by the two procedures indicated below.

*Procedure (A).*—Epoxidized polybutadiene X (100 g.) was dissolved in 1 liter of benzene and HCl gas was bubbled through the stirred solution at room temperature. After 10 minutes, 25 g. of HCl had been picked up by the reaction solution and the temperature had risen to 50° C. The reaction solution was added slowly to an excess of heptane to precipitate the product. The precipitate was redissolved in benzene and again precipitated with heptane.

The fresh product was a white powder which, after drying overnight at room temperature, turned to a light brown semi-solid mass. Elemental analysis: C, 67.1; H, 10.4; O, 10.4; Cl, 14.5. This conforms to approximately one HOCl group per 3.5 butadiene units. It had the following solubility characteristics: good solubility in acetone and methyl ethyl ketone; fair solubility in benzene, toluene, and tetrahydrofuran; poor solubility in methanol, isopropanol, styrene, and vinyl toluene.

*Procedure (B).*—A reaction similar to (A) was performed, with the exception that only about half the weight of HCl was picked up, i.e., about half as many epoxide groups were hydrochlorinated. HCl gas was bubbled into 500 g. of epoxidized polybutadiene in 3.78 liters of benzene until 53 g. (i.e., about 11 g. per 100 g. of polybutadiene) of HCl were picked up. The semi-solid product was worked up as described in (A).

The resulting polybutadiene chlorohydrin polymer had approximately the same solubility characteristics as did the polymer of run (A). It contained approximately one HOCl unit per 7 butadiene units.

Runs (A) and (B) illustrate the preparation of the present polybutadiene chlorohydrin polymer via a two-step procedure involving epoxidation and hydrochlorination.

Examples 4–14

The polymers produced in experiments 2 and 3, denoted below as (A) and (B), respectively, were compounded with various curatives and catalysts to test their ability to cure at room temperatures. In the recipes given in Table I, the polymer was initially dissolved in toluene diisocyanate (TDI). In those recipes employing glycol, the glycol was then added to the resulting solution. Finally a cure catalyst, e.g., triethylamine, was added to the recipe. The recipe was allowed to cure at room temperature, without compensating for the exothermic heat of reaction. The products thus formed are indicated below.

TABLE I

| No. | Recipe | Results |
|---|---|---|
| 1 | 5.0 g. (A)<br>2.5 g. TDI (toluene diisocyanate)<br>0.1 g. Et₃N | Hard casting in a few seconds. |
| 2 | 4.0 g. (A)<br>6.0 g. TDI<br>2.0 g. propylene glycol [a] | Hard foam in 10 minutes. |
| 3 | 4.0 g. (A)<br>6.0 g. TDI<br>2.0 g. 2,3-butanediol [b]<br>0.5 g. Et₃N | Gelled in <1 minute. Hard foam in 10 minutes. |
| 4 | 4.0 g. (A)<br>6.0 g. TDI<br>2.0 g. 2,3-butanediol [b] | Hard casting containing a few bubbles. |
| 5 | 2.5 g. (A)<br>1.0 g. TDI<br>1.5 g. solvent [c]<br>0.25 g. Et₃N | Hard, clear, nonbrittle castings overnight. |
| 6 | 2.5 g. (A)<br>1.0 g. TDI<br>1.5 g. acetone<br>0.25 g. (C₂H₅)₂NCH₂CH₂OH | Clear, rubbery casting. |
| 7 | 4.0 g. (B)<br>2.0 g. TDI<br>0.5 g. Et₃N | Hard casting. |
| 8 | 4.0 g. (B)<br>3.0 g. TDI<br>1.0 g. 2,3-butanediol [b]<br>0.5 g. Et₃N | Do. |
| 9 | 4.0 g. (B)<br>6.0 g. TDI<br>2.0 g. 2,3-butanediol [b]<br>1.0 g. Et₃N | Hard foam. |
| 10 | 4.0 g. (B)<br>6.0 g. TDI<br>2.0 g. 2,3-butanediol [b]<br>0.5 g. (C₂H₅)₂NCH₂CH₂OH | Hard, clear casting. |
| 11 | 4.0 g. (B)<br>6.0 g. TDI<br>1.0 g. 2,3-butanediol [b] | Hard, clear casting after 10 minutes at 80° C. in vacuum oven. |

[a] A reactive, hydroxyl containing diluent—contains both primary and secondary hydroxyl groups (primary more reactive.)
[b] A reactive, hydroxyl containing diluent—contains only secondary hydroxyl groups.
[c] Solvent used to reduce viscosity of mix, thereby making it easier to handle. Solvents used were MEK, benzene, or tetrahydrofuran.

As shown in Table I, the polychlorohydrin polymers of the present invention can be cured in a relatively short time to provide hard castings as well as other useful products, e.g., hard foams. Such cured resins are of particular interest in applications such as laminates, potting compounds and rigid foams.

Various modifications may be made to the present invention. For example, if desired, the polychlorohydrin polymers may be cured at higher than room temperatures via the use of diisocyanates or typical curatives such as polybasic acids and anhydrides.

Having described the present invention, that which is sought to be protected is set forth in the following claims.

What is claimed is:

1. A process for obtaining a cured casting under room temperature conditions, which comprises admixing with toluene diisocyanate a polychlorohydrin derivative of an oily polybutadiene polymer, obtained by reacting said polybutadiene polymer with an alkyl hypochlorite and water at a temperature of 10 to 75° C. and allowing said admixture to cure, said polychlorohydrin derivative having a number average molecular weight of 400 to 10,000 and containing one chlorohydrin group per 1 to 10 butadiene units.

2. The process of claim 1 wherein a tertiary amine cure catalyst is employed in conjunction with said diisocyanate.

3. The process of claim 1 wherein a $C_2$ to $C_{10}$ aliphatic glycol diluent is employed in conjunction with said diisocyanate and tertiary amines.

References Cited by the Examiner

UNITED STATES PATENTS

| | | | |
|---|---|---|---|
| 2,046,469 | 7/1936 | Langedijk | 260—633 |
| 2,660,563 | 11/1953 | Banes et al. | 260—94.7 |
| 2,877,212 | 3/1959 | Seligmann | 260—77.5 |

OTHER REFERENCES

Hackh's Chemical Dictionary, 3rd edition, p. 593, published by McGraw-Hill Book Company Inc., New York.

Webster's 3rd New International Dictionary, p. 1571, copyright 1965.

LEON J. BERCOVITZ, *Primary Examiner.*

DONALD E. CZAJA, *Assistant Examiner.*